June 1, 1965 B. GUIGNARD 3,186,600
FLEXIBLE PLASTIC CONTAINER WITH HELICALLY
DISPOSED PLASTIC GRAIN
Original Filed Jan. 16, 1961 6 Sheets-Sheet 1

INVENTOR.
BORIS GUIGNARD
BY
ATTORNEY

June 1, 1965 B. GUIGNARD 3,186,600
FLEXIBLE PLASTIC CONTAINER WITH HELICALLY
DISPOSED PLASTIC GRAIN
Original Filed Jan. 16, 1961 6 Sheets-Sheet 6

INVENTOR.
BORIS GUIGNARD
BY

ATTORNEY

United States Patent Office

3,186,600
Patented June 1, 1965

3,186,600
FLEXIBLE PLASTIC CONTAINER WITH HELICALLY DISPOSED PLASTIC GRAIN
Boris Guignard, Luccns, Switzerland, assignor to Compagnie Financiere pour le Developpement Industriel C.O.F.I.D.I. Societe Anonyme, Nyon, Switzerland, a corporation of Switzerland
Original application Jan. 16, 1961, Ser. No. 82,940, now Patent No. 3,109,198, dated Nov. 5, 1963. Divided and this application Oct. 11, 1962, Ser. No. 229,919
Claims priority, application Switzerland, Jan. 27, 1959, 68,807
2 Claims. (Cl. 222—107)

This invention relates to containers, more particularly tubes of plastic material for packaging cosmetic products, tooth paste, and other products of similar consistency, and more particularly to articles produced by the method defined in my co-pending application Serial No. 82,940, filed January 16, 1961, now Patent No. 3,109,198, of which case this is a division; and said application Serial No. 82,940 being a continuation-in-part of my former application Serial No. 795,504, filed Febraury 25, 1959, now abandoned.

Various method have been heretofore proposed for producing containers and, chiefly, tubes of plastic material, said methods consisting in particular in extruding, trace-pressing, molding, or injecting the material into a die chamber, or, in welding separately formed juxtaposed elements.

The first method, to wit: the extruding method leads to considerable difficulties when it is desired to extrude an article having a thin wall, more especially at the input end. The method of molding through a punch and die, or through gravity, is a slow and expensive procedure. The intermittent injection of a plastic material into a mold to make a hollow article having a thin wall, has never been attained successfully on an industrial scale, and the same is the case for ordinary simple injection, although various modus operandi have been proposed, because, the force of injection requires a pressure which is too high where thin-walled articles are to be formed. This is true because it is difficult from a practical standpoint to distribute the plastic material between sections of the mold which are relatively stationary with reference to one another. It has been attempted to remove this disadvantage by providing relative mobility between the sections forming the mold used for injection, whereby, the sections of the mold move in succession in front of the supply of injecting material.

The foregoing method has not, however, produced the desired results because the plastic material does not lend itself to proper execution of such an operation, and, the thin flexible walls, constituting the skirt of a tube or of the cylindrical section of a container, do not offer a sufficient mechanical resistance by reason of their lack of homogeneity. Furthermore, the container or tube obtained in this manner adheres to the mold parts and, for removing same, it is necessary to inject air under pressure between the core and the molded tube, which frequently leads to a deformation of the very fragile tube particularly if the pressure is not properly controlled.

My invention has primarily in view a method of production which eliminates the objections to the methods hitherto proposed and briefly summarized above. That is to say, the present method and apparatus provide for the production of containers having an end wall and a side wall of generally cylindrical shape both made of plastic material through injection of the latter in its flowable state into a transiently formed mold over and about a core moving axially during the injection of the homogeneous plastic material. In that connection the improvements are characterized by the fact that the plastic sidewall forming material is helically distributed uniformly over the core. Moreover, according to the means resorted to for producing said helical distribution, the plastic material is preferably kneaded just before it is distributed helically round the core. This kneading or stirring bestows upon the plastic material, an improved uniform homogeneity which allows it to be more readily injected, and also to form very thin tough walls for a hollow article such as a container or a tube. Experiments have shown that the helical distribution of plastic material for the formation of a thin cylindrical wall produces a distribution of the molecules of plastic material such that the mechanical resistance of said thin wall is considerably increased.

In addition, it may be emphasized that after this injection of the thin wall of a hollow article such as a container or a tube, the rapid withdrawal of the core may be effected so that said article drops free by gravity from the core over which it has been formed, thereby avoiding risk of deformation.

My invention has for a further object a novel apparatus for executing the above-described method, said apparatus being of the type including a mold constituted by a die and a punch, the body of which forms a core over and about which is formed the wall of the hollow article or container to be molded. This punch is shiftable within a sleeve, whose end in cooperation with the punch forms a nozzle through which the injection of plastic material is formed under pressure, as the core is axially shifted. Moreover the present apparatus includes an annular distributor of plastic material, carried by a tube surrounding the punch, while a driving mechanism imparts a relative angular movement to the distributor with reference to the punch, around the common geometrical axis of said parts, during the formation stage of the container wall.

My invention also covers, as a novel article of manufacture, the generally cylindrical containers and tubes obtained through the method and apparatus disclosed hereinabove.

That is to say, another object of this invention is to provide a tubular container including an injection molded head and an integral side wall formed by extrusion and wherein said side wall presents a helically oriented continuous surface.

A further object of the invention is to provide a container of the type described, made of suitable thin plastic material wherein the sides may be subjected to flexing pressure with a minimum of liability of rupture when squeezing the contents of the tube through a suitably capped orifice.

I have illustrated diagrammatically in the accompanying drawings, given by way of exemplification, an embodiment of the apparatus for the execution of my improved method.

In the drawings:

FIGURE 2ª is an enlarged fragmentary view of a portion of that part of FIGURE 2 forming the die chamber and the gate for controlling the supply of plastic to the chamber.

FIGS. 3 and 4 are vertically alined this relatively minute differential movement will be apparent by applying a straight-edge.

FIGURE 9 is a detail cross-sectional view of the first form of kneading head taken on the line 9—9 of FIGURE 1.

FIGURE 10 is a detail side elevation of the kneading head of FIGURE 9.

FIGURE 10$^a$ is a detail side view illustrating a modification of the kneading head when the fins for kneading the plastic material are helical.

FIGURE 12 is a view similar to FIGURE 11 illustrating the termination of the extraction stroke which enables the finished article to be removed from the apparatus.

Similar reference characters designate corresponding parts throughout the several figures of the drawing.

GENERAL DESCRIPTION

Figures 1, 13:
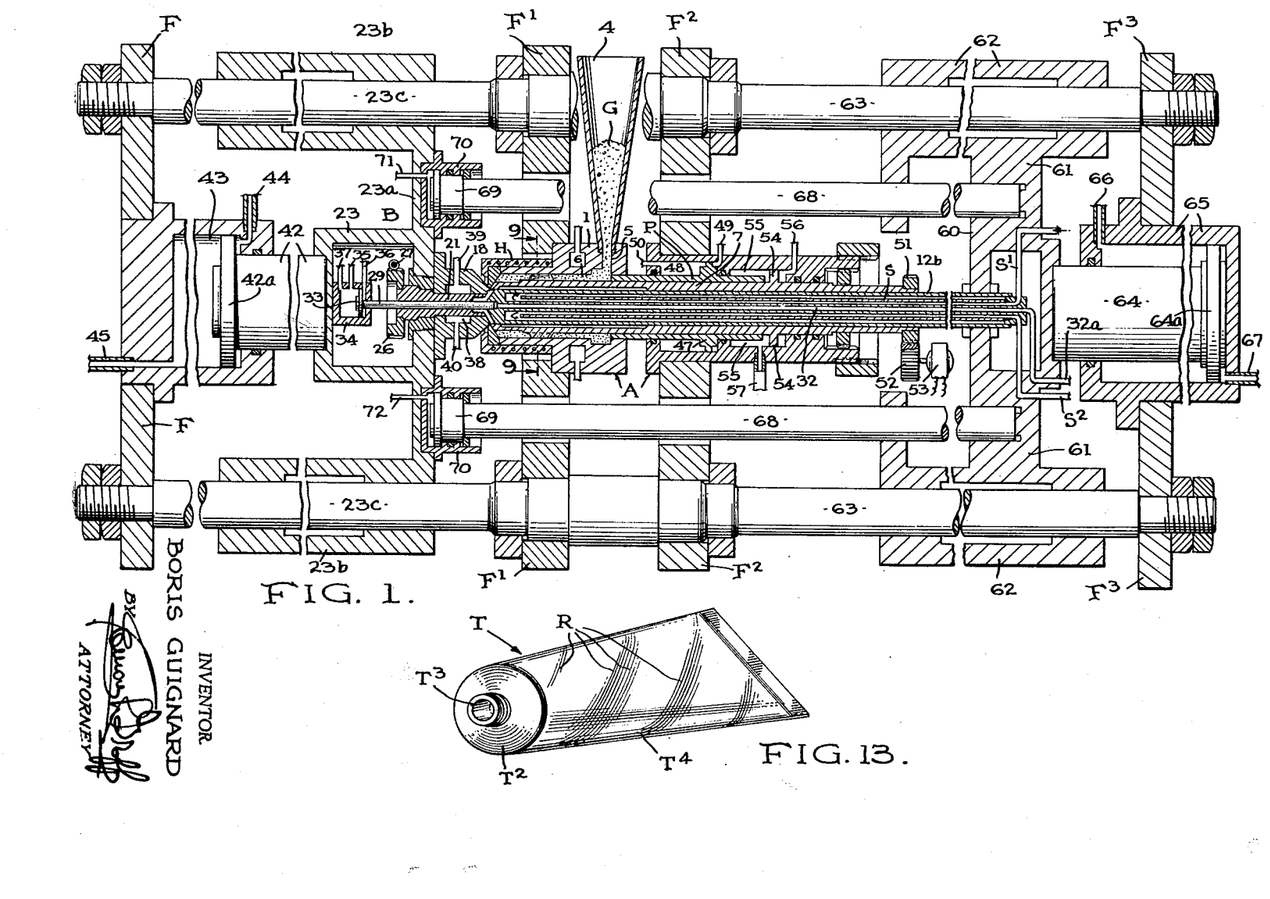
FIGURE 1 is an overall schematic view of the entire apparatus.
FIGURE 13 is a perspective view of the completed tube as shown, for example, in FIGURE 8.
Figures 2, 2A:
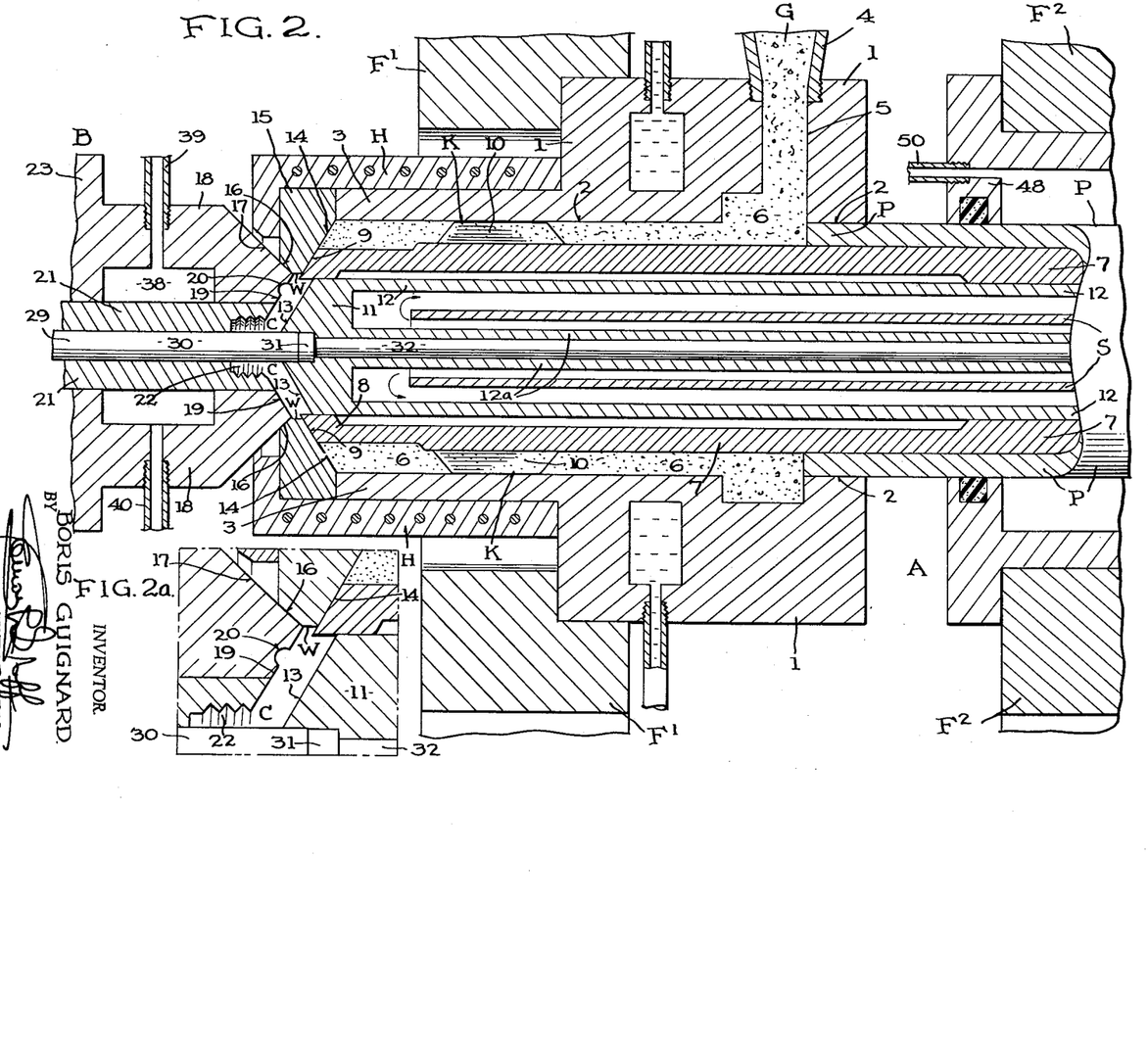
FIGURE 2 is an enlarged detail cross-sectional view of that portion of FIGURE 1 which includes the plastic feeding means, the means for kneading and distributing the plastic material and the tubular elements which control the gate to the plastic extrusion procedure relative to the movable die which cooperates to form the end wall of a tubular plastic article, all of said parts being in the relative position about to start the preliminary extrusion phase, that is at a point where all of the plastic material being still held or trapped in the kneading chamber.

Reference will first be made to FIGS. 1 and 2, more especially to the latter to obtain a preliminary understanding of the structural features constituting the mold of the apparatus.

FIG. 1 illustrates the relatively fixed extrusion assembly A and the relatively movable die head assembly B. FIG. 2 illustrates on an enlarged scale the major parts of these two primary elements of the apparatus. For all practical purposes the extrusion assembly is relatively fixed, although some of its parts reciprocate and rotate during the operating cycle, while the die assembly moves bodily back and forth. Together these assemblies form the die cavity C which communicates with a feed opening at the end of the extrusion assembly that faces the die assembly B.

The extrusion assembly includes stationary frame parts F, $F^1$, $F^2$, and $F^3$, fixedly supporting a main stationary body 1 having a bore 2 extending therethrough and which continues into a sleeve 3 rigid therewith and extending from one end thereof.

The aforesaid bore 2 houses a plurality of coaxially tubular elements, one of which is a plastic extruding piston P, each having timed sequences of operation in the direction of their axes, also at least one having angular movement as will hereinafter more fully appear.

Further the body 1 is provided with a hopper 4 which receives the raw plastic material generally in the form of granules as indicated at G.

As will be also seen from FIG. 2, a feed passage 5 disposed radial to the bore, connects the hopper with an annular kneading chamber 6 between the bore and the outer surface of a lesser diameter axially, and angularly, movable plastic material conditioning tube 7, the said piston P operating in the chamber 6 defined by bore 2 and outer surface of said tube 7, to extrude a slug of plastic material into the aforesaid die cavity C and around the outer face of a reciprocal core as will presently be seen.

The tube 7 has an annular nozzle 8 at one end terminating in a conical material cutoff and release face 9. Inwardly of this face the tube 7 is provided with an annular series of spaced vanes 10 which form a fluted kneading head K operating in the chamber 6. These vanes may be in parallel spaced relation as shown in FIGS. 1-10, but may also be formed in a helical manner as sown at K' in FIG. 10$^a$, and form the aforesaid kneading head which cooperates with the bore 2 to homogenize the heated plastic granules into a flowable uniform consistency to form the article. Thus the articles T and T' will have their side walls or skirt portions $T^4$ formed about the rotating tube 7 and a spiral grain effect is produced. Thus, the wall becomes stronger because of the reinforcement resulting from the spiral ribs R in the finished article.

Thus, since the tube 7 is rotatable about its axis, it will be seen that its surface in cooperation with the facing surface of the bore 2 provides a mixing chamber wherein the plastic material is subjected to a shearing action augmented by kneading head K to continuously homogenize the flowable plastic material which is kept in a flowable state by the heater H in the form of an insulated coil disposed about the sleeve 3.

A combined punch and core member, including a transverse wall 11 and an elongated tubular barrel-like core 12 is coaxially mounted within the conditioning tube 7 for slidable movement relative thereto. The transverse end wall 11 has a conical surface 13 of the same pitch as the conical face 9 of the nozzle 8 of the conditioning tube 7. This face 9 is intended to flushly contact the matching or first conical surface 14 as it is hereinafter referred to, of an annular draw plate 15 fitted to the outer end of sleeve 3.

The draw plate has an outer or second conical face 16 intended to flushly contact and receive a mating conical sealing face 17 of a reciprocating die 18 having an inner conical end wall 19 parallel with surface 13 of end wall 11 of the punch and spaced therefrom to provide a die cavity C. The wall 19 has a slight depression 20 which forms a container head key when filled with plastic and to prevent rotation of the container as will later appear. Also the die 18 is provided with a rotatable mandrel 21 having an internally threaded socket 22. The socket 22 forms the externally threaded neck of the container, and when this neck is complete, and the mandrel is rotated the end wall of the container is held stationary by the key formed in 20 so that unthreading of the neck may proceed as shown in FIG. 8.

The draw plate 15 also has its converging first and second conical faces 14 and 16 intersected by a flat wall W parallel to the axis of the ring or nozzle and located at a point between edges of nozzle face 9 and the second conical face 16. That is to say, wall W is spaced radially from the outer surface of core 12 to define the thickness of the side wall of the container. Also, the location of this wall W insures uniform formation of the container side wall as the punch 11-12 moves through the nozzle or gate constituted by the mating surfaces 9 and 14 and wall W for controlling the supply of plastic to the die cavity C.

Figure 6:
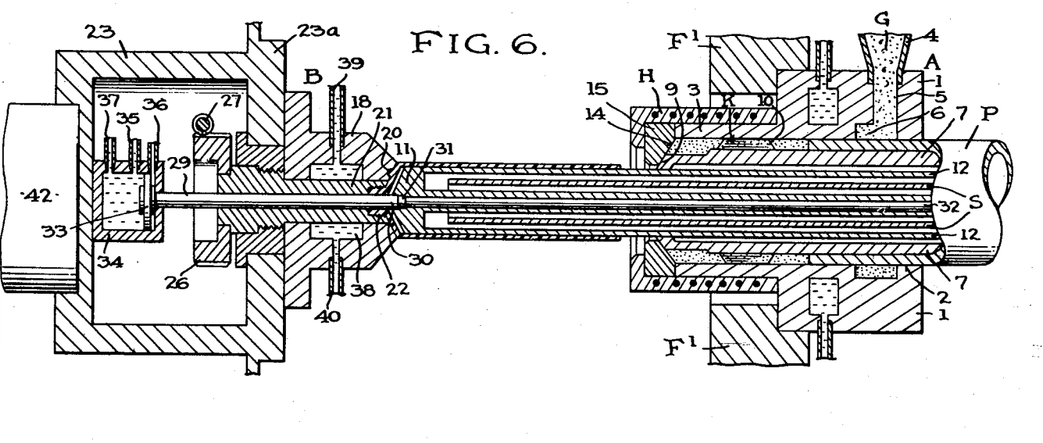
FIGURE 6 is a diagrammatic view showing the phase following the complete extrusion phase, namely, the phase wherein the skirt or side wall is cut or terminated opposite its now pre-formed closed end to define the length of the tube.
Figure 7:
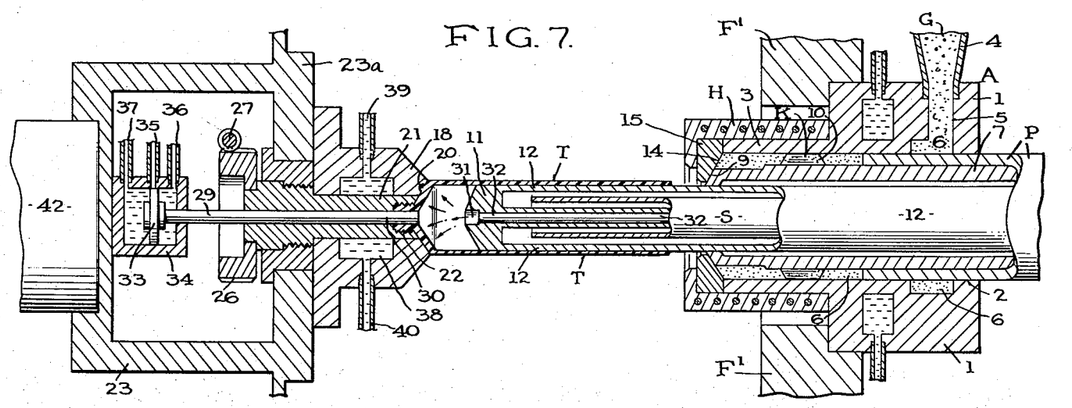
FIGURE 7 is a further diagrammatic view illustrating the phase wherein the punch is performing its initial withdrawal from the formed article, this phase taking place simultaneously with the sending of mildly compressed cool air into the tube.
Figure 8:
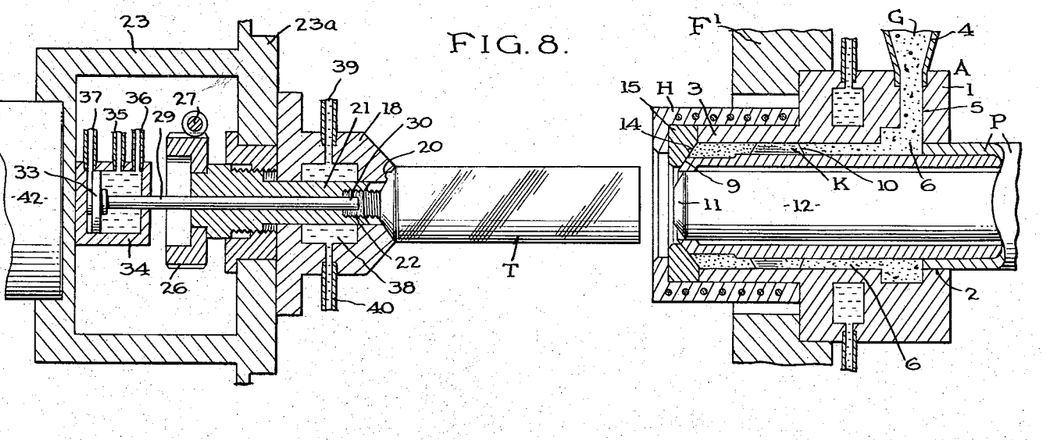
FIGURE 8 is another diagrammatic view illustrating the phase of removing the finished tube, the punch being fully withdrawn from the article, and the die having been rotated to release the threaded neck of the finished tubular container.

When faces 9 and 14 are engaged, they seal the exit of the kneading chamber 6 at the beginning of the extrusion phase, FIGS. 1 and 2; and, also, again seal off the chamber 6 at the end of the extrusion phase, as shown in FIGS. 6, 7, and 8.

Figure 3:
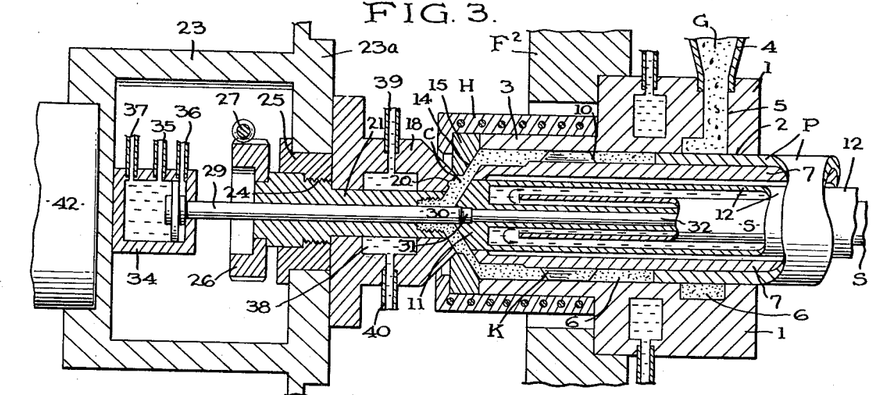
FIGURE 3 is a diagrammatic view showing somewhat more of the parts of FIG. 2 with their positions changed to show the accomplishment of the first phase of injection of plastic material into the mold to form the end wall of the container.
Figure 4:
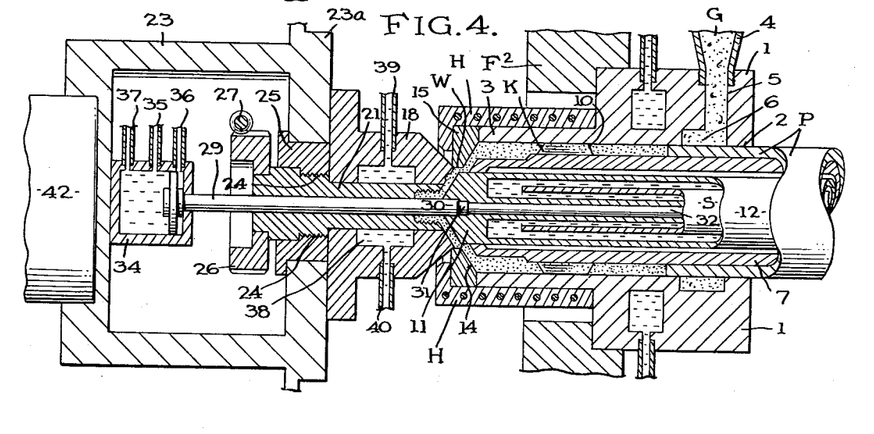
FIGURE 4 is a diagrammatic view showing the parts of FIGURE 3 wherein the so-called punch has made an additional forward movement of several millimeters relative to the die, whereby a portion of the heated plastic material injected into the mold cavity is compressed and forced back into the kneading chamber which causes a slight recoil of the injection piston. Since
Figure 5:
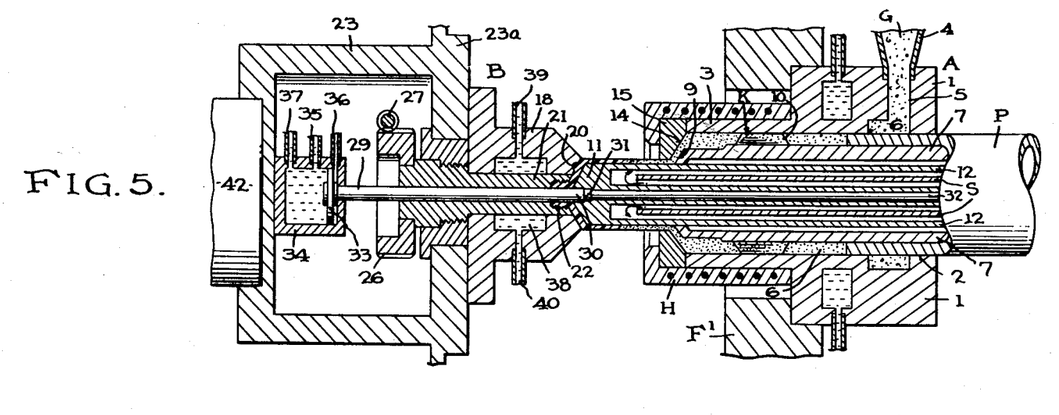
FIGURE 5 is a diagrammatic view showing that portion of the extrusion phase wherein the skirt for the wall portion of the tube is begining to be continuously formed by displacement of the punch out of its fixed housing simultaneously with the movement of its end wall towards the left to follow the die.

Between closed positions above described, the gate formed by the surfaces 9 and 14 is fully open as in FIG. 3 to admit plastic to the die cavity C to form the end wall of the article, and thereafter the gate is open to a lesser degree as in FIGS. 4 and 5 to form the side wall of the said container.

Once the side wall of the container is fully formed as shown in FIG. 6, the gate is closed to cut off the plastic material to determine the end of the tube, and remains closed as shown in FIGS. 7 and 8 as the article T prepares to drop.

The gate, in FIGS. 6, 7, and 8, at the completion of the extrusion cycle, also remains closed as shown in FIGS. 1, 2, and 2a, in preparation for the next extrusion cycle.

FIGS. 1, 2 and 2a illustrate the heart of the invention in the respect that the structure makes possible for the first time, the simultaneous molding of a container end wall and an externally threaded neck having a dispensing passage in one operation, while continuing to make the integral homogenized plastic skirt or side wall as a part of the continuous article forming cycle.

The extrusion phase of the plastic material is accomplished by the tubular reciprocating piston P which surrounds, and is coaxial with the material conditioning tube 7. This piston is controlled by an auxiliary power unit (FIG. 1) and later described more in detail.

*Movable die assembly*

The movable die assembly includes the transient mold cavity C (FIGS. 1-8) constituted by the wall 19 of die 18 and complementary surfaces W and 13, respectively, of the draw plate 15 and head 11 of the combined punch and core 11-12.

The die head itself, 18, is carried by a hollow reciprocating block 23 (FIGS. 1, 3-8, 11, 12) through which extends the aforesaid tubular mandrel 21 having internally threaded socket 22.

Thus, since this socket forms the threaded neck T³ of the container, in this instance, it is necessary to rotate the mandrel 21 to unthread said neck from the socket and free the container from the mold after its side wall is complete.

Accordingly, the mandrel 21 has its intermediate portion externally screw threaded as indicated at 24 to engage the tapped bore of the annular nut 25 fitted to one side wall of said movable block 23. This transverse block is mounted on cross arm 23a having tubular guides 23b at opposite ends thereof, said guides slidably supported on fixed guide rods 23c constituting a part of the frame F, F'.

On the lefthand end of the mandrel 21 (FIGS. 1-8) is a gear wheel 26 provided with a peripheral series of teeth meshing with a worm 27 adapted to be rotatably driven through any suitable auxiliary power unit, such as an electric motor or the like.

The mandrel 21 has an axial bore which receives a rod 29, the end 30 of which passes through the socket 22 and engages a recess 31 in the end wall 11 of the combined punch and core 11-12. This recess communicates with an air passage 32 in the core stem 12a leading to a source of low pressure air to facilitate the withdrawal of 11-12 from the side wall of the finished tube T to avoid a vacuum which would tend to collapse the tube.

The purpose of end 30 passing through socket 22 is to provide a passageway or bore, open at both ends, in the externally threaded dispensing neck of the container for the discharge of its contents. The end of 30 also seals passage 32 so that no air enters the side wall or skirt of the container until the proper time.

The rod 29 carries at its opposite end a piston 33 slidably mounted inside a cylinder 34 having conduits 35, 36 and 37 which may all three be fed with fluid under pressure. In the position represented in FIGURES 1 through 6, conduits 35 and 37 are under pressure, conduit 36 being an outlet. In the position shown in FIGURE 7, conduit 36 is under pressure, while conduit 35 is an outlet. As to conduit 37, it may either be closed to maintain a certain volume of fluid in cylinder 34, or be kept under pressure so that the piston may be maintained in intermediate position.

In the position shown in FIGURE 8, conduits 35 and 36 are under pressure, while conduit 37 is made the outlet.

When fluid is supplied through pipe 37, the piston 33 is driven forward to the position shown in FIGS. 1-4 to reset the rod 29 into recess 31.

A chamber 38 is provided inside the head 18 between the latter and the mandrel 21, said chamber communicating with the outside through the pipes 39 and 40, so as to allow the introduction of cooling water into chamber 38 to keep the head 18 at the proper temperature.

The reciprocating die head support block 23 is connected with a piston 42 carrying a flange 42a operating in a cylinder 43 having fluid connections 44 and 45. It will thus be understood that hollow block 23 supporting die head 18 can reciprocate back and forth as shown in FIGS. 5-8 inclusive to correspond with the axial movement of the combined punch and core 11-12 as the side wall or skirt of the article T is formed.

The actuating and cycling elements of the operation as a whole will now be described.

*Means for controlling plastic extruding piston*

The piston P which surrounds the material conditioning tube 7 operating in the kneading chamber 6 is provided with an external flange 47 (FIG. 1) operating in a cylinder 48 having fluid connections 49 and 50. As fluid pressure is applied through 49 to one side of the flange 47, the leading edge of the piston pushes an increment of angular material from the port 5 into the kneading chamber 6 toward the kneading head K, in the presence of heat.

In FIG. 1, the flange 47 is shown at the extreme right-hand end of chamber 48 as when the leading edge of the piston is fully retracted and the piston is ready to start the extrusion stroke to move the plastic material between the faces 9 and 14 of the gate as shown for example in FIGURES 3 and 4.

The fluid passages 49, 50, which together with the flange 47 control the sliding movement of the piston P are included in a fluid circuit having suitably controlled timing means for actuating the piston when the apparatus is operating to produce the tubular articles. In other words, it will be understood that the back-and-forth strokes of the piston P are synchronously controlled with respect to other movements of the apparatus which will be described more in detail under the "General Operation."

*Means for operating plastic material conditioning tube*

The plastic conditioning tube 7 having the vanes 10, forming the kneading head has both rotary movement and a relatively small reciprocating movement in the bore 2.

Referring to FIGS. 1 and 2, it will be seen that said tube 7 has its rear end portion exposed to receive a gear 51 driven by a gear 52 which in turn is driven by a motor 53 in order to impart the necessary angular or rotary movement to the kneading heads K (or K').

At this point it may be noted that the teeth of gear 51 are of less width than the related teeth of gear 52 so that although the motor 53 is supported in a fixed position, the gear 51 will never disengage with said driving gear 52 as the tube 7 reciprocates to open and close the extrusion gate.

For the purpose of imparting the aforesaid axial forward or backward longitudinal movement to the tube 7 to control the outlet gate relative to the draw plate, the external surface of the tube is provided with an annular flange 54 which operates in a fluid chamber 55. This chamber 55 has a fluid connection 56 at one side of the flange 54, and a fluid connection 57 at the other side of said flange. Fluid pressure on the righthand side of the flange moves the tube 7 to gate closing position, and pressure on the other side opens the gate.

As will be observed from FIG. 1, the rear end portion of core $12^b$ of the combined punch and core 11, projects beyond the location of the rotary driving elements 51, 52, and 53, and is secured in the yoke 60 of reciprocating head 61 having sleeve portions 62 slidably mounted on the parallel guide rods 63 fixed in the frame parts $F^2$ and $F^3$.

It will also be observed that the guide rods $23^c$ supported in frame parts F and F′, and the guide rods 63 rigidly supported in the frame parts $F^2$, $F^3$, are actually integral and therefore in axial alignment.

Further, the cross-head 61 is actuated by a piston 64 operating in a cylinder 65 carried by the frame part $F^3$ of the apparatus. The head of piston 64 is connected to the yoke 60, and the flange $64^a$ of piston 64, which is of larger diameter than flange $42^a$ of piston 42, is subject to fluid pressure on opposite sides thereof as it operates in the cylinder 65. The cylinder 65 has fluid connections 66 and 67.

The yoke 60 and cross-head 61 are connected by shafts 68—68 with related pistons 69 operating in cylinders 70 carried by the cross arm $23^a$.

From the foregoing it will now be apparent that the pistons 42 and 64 are operatively tied together so that as the block 23 supporting the die head 18 moves toward and from the draw plate 15, the combined punch and core member 11 and 12 will have a corresponding back-and-forward axial movement.

*Modified construction*

Figures 9, 10, 10A, 12:
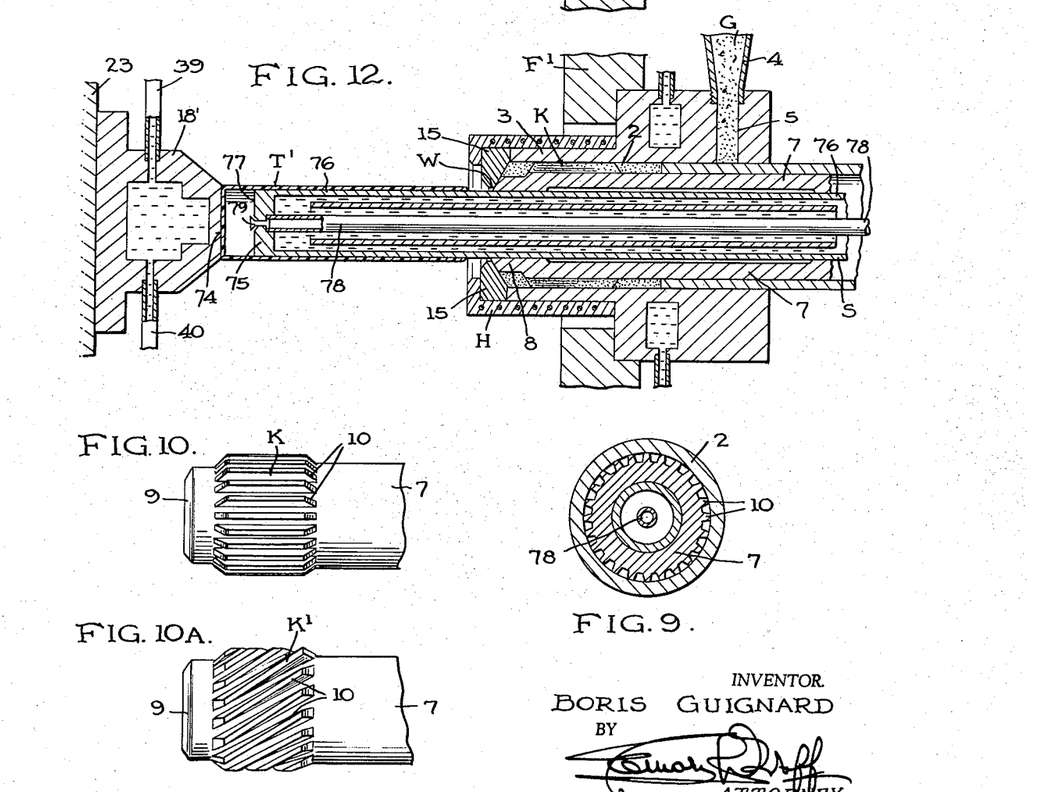
Figure 11:
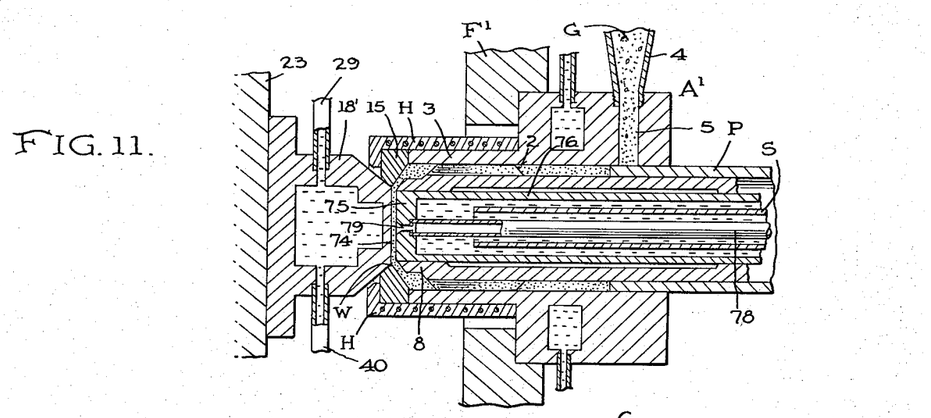
FIGURE 11 is a detail sectional view illustrating modification of the apparatus for producing flasks with a closed end wall.

FIGS. 11 and 12 are directed to a modified form of apparatus for making tubular containers T′ having a flat closed end wall.

The extrusion assembly A′ is the same as that previously described, but the die head 18′ constituting the end wall forming means does not require means forming a threaded neck on the end wall. That is to say, the die assembly B′ simply reciprocates back and forth with the punch and core 11–12 and does not rotate.

In the embodiment illustrated in FIGS. 11 and 12, the die head 18′ is provided with a flat terminal wall 74 adapted to engage the bore W in the draw plate 15. As to the combined punch and core 75–76, its forward end 75 is also provided with a flat terminal surface 77. However, in order to allow sending compressed air between the surface 77 and the bottom of the flask, a channel 78 feeding compressed air is provided axially of the inner bore surface of core 76. The outlet end of said channel is controlled by an automatic valve 79.

The operation of this form of apparatus intended for the production of flasks is fully similar to that of the apparatus described with reference to FIGS. 1 to 8. In other words, mixing and kneading tube 7 for conditioning the plastic is still driven in rotation during the injection stage, so as to produce a kneading of the pasty material between said tube and the inner wall of the bore 2 of body 1. During the injecting movement, the punch and core 75–76 move together with the movable die section 18′, while the container skirt is obtained gradually through a helical distribution of the plastic material round the core 76. Once the container skirt has reached the desired length, the tube 7 is shifted axially, so as to close the injecting gate or nozzle. This being done, the combined punch and core 75–76 is returned into its retracted starting position while simultaneously air is blown into the inside 59 of the molded flask through the channel 78 after unseating the valve 79. The article T′ is released gradually with reference to the combined punch and core 75–76 and drops finally into any desired collecting receiver.

It will of course be understood that the mechanism driving the plastic material conditioning tube 7 is synchronized with the mechanism producing the axial shifting of the combined punch and core 75–76 outwardly of the sleeve 2, so as to obtain a uniform helical distribution of the plastic material round the core.

CYCLE OF OPERATION

Referring first to the parts of the apparatus shown in FIGURES 1 and 2, namely, the position where the gate 9–14 closes the cavity C, and the plastic material from the hopper 4 is being fed into the mixing and kneading chamber 6 through the inlet port 5, it will be understood that since the kneading and mixing tube is rotating, the plastic material will be changed from granular to homogenized fluid state by the heater H.

With the parts thus ready for operation, the first step would be to open the gate 9–14 or feed opening to permit the piston P to move the plastic into the cavity C, as shown in FIGURE 3.

After the cavity C and internally threaded socket 22 are filled with plastic, the conical surface 13 of the head 11 of combined punch and core 11–12, is advanced towards the die head 18, a small distance, such as a few millimeters to insure that the fluid plastic within the die is completely compacted to fill all the interstices within the die, and also push some of the plastic material back into the kneading chamber 6 (FIGS. 3 and 4).

This advance of the punch 11 is effected by removing or exhausting fluid from cylinders 70 through lines 71–72 shown in FIGURE 1. As a result, the pistons 69 and shafts 68 move to the left, as shown in FIG. 1, and inasmuch as the other extremities of the shafts 68 are anchored in the cross-head 60, said cross head will be caused to move with the shafts, and, in turn, the combined punch and core unit 11–12, anchored to this cross-head will be slightly advanced, and the various elements will appear as shown in FIGURE 4.

In the phase of partially compressing the plastic material in the region of the die head any excess fluid plastic is, as aforesaid, pushed back through the gate 9–14 to the chamber 6, thereby, avoiding the formation of an excess of material at the junction of the head and the skirt of the tube which would form a ridge or ring.

With the end wall and neck of the article T thus formed, as shown in FIGURE 4, the operation will now be explained wherein the integral skirt portion of the tube is formed.

Synchronized movement of core 11 and head 18 is accomplished by sending fluid under pressure into conduits 67 and 45, in such a manner as to maintain core 11 and head 18–19 near to one another. In fact, for this purpose the flange $64^a$ has a greater diameter than flange $42^a$, in order that their pistons provide a differential action. Rods 68 insure synchronized movement of members 11 and 18 by preserving the thickness of the end wall of tube T formed in the space C.

As the outer surface of the core 12 projects through the orifice of gate 9 and 14, the fluid plastic material in the form of a film predetermined by the space between W and the outer surface of the core 12, is continuously deposited by the force of piston P around the entire perimeter of the core, resulting in the side wall having a smooth helically oriented surface comprising a plurality of relatively minute helically disposed ribs R.

After the relative positions of the core assembly A and die assembly B have advanced from the skirt forming position of the article shown in FIG. 5, to a point where it is desired to terminate the length of the skirt or side wall of the article, the gate orifice constituted by surface 9 and 14 closes, thereby discontinuing the deposit of fluid plastic material on the outer surface of the core 12. This is fully shown in FIGURE 6.

During the entire operating cycle, cooling fluid is circulated within the space between the inner face of the core 12 and the sleeve S, the said cooling fluid being supplied through a fluid line S' and exhausted through line $S^2$.

For the fabrication of tubes T from polyamide, whose crystallization is very rapid, the water circulating in core 11 is water warmed to about 80° C. so as not to cause cooling of the core beyond 80° C. and thus prevent too rapid crystallization of the polyamide.

The next step is to retract the end 30 of the rod 29 from the recess 31 in the end wall 11 to the position shown in FIG. 7. By moving the end 30 away from air passage 32 (FIG. 7), the latter is uncovered to establish communication with a low pressure source of air, or even the atmosphere, through line $32^a$, for example. This is done to prevent the formation of a vacuum in the skirt of the article being formed which might otherwise tend to collapse said skirt or implode the tube. The necessity for providing a certain amount of air pressure depends upon the plastic materials utilized. During employment of polyamides which contract only slightly, once tube T is formed it may be readily disengaged from the core. On the contrary, tubes formed from polyethylene tend to cling to the core and some air pressure is needed to release the tube T.

Concerning the extraction of finished tube T from the core, silicones may be vaporized in the air blown in through conduit $32^a$ into the core. The silicones blown in simultaneously with the air cause a lubricating of the external surface of the core, which facilitates disengagement of finished tube T.

After the rod 29 has been fully retracted from the externally threaded neck of the article T, it will be understood that the end wall of the article is held against rotation because a small plastic key has been formed in the depression 20.

The mandrel 21 and its internally threaded socket is then rotated by the worm and gear 26, 27, to unthread and release the neck $T^3$ of the article from the mandrel so that it may be dropped into a suitable container.

The retraction of the combined punch and core 11 and 12 from the positions shown in FIGS. 6, 7, to the position shown in FIGS. 1 and 8, is affected by reversing the application of fluid pressure to the cylinder 65 so that the piston 64 is returned to its initial starting position as shown in FIG. 1. This will completely retract the core punch assembly to its position shown in FIG. 8. During this operation the fluid pressure is maintained against piston 42 so that the article T will be free for ready removal. After removal the tube may have its end opposite the threaded neck $T^3$ closed as shown in FIGURE 13.

It will of course be understood that the foregoing cycle of operation repeatedly occurs as long as the apparatus is in operation.

I claim:
1. In a flexible plastic container,
 (a) a tubular seamless plastic side wall of such thickness that it may readily collapse by external pressure;
 (b) the upper end of the side wall being predominantly closed and having means forming a discharge opening for the container;
 (c) said side wall being smooth internally and externally and having a helically disposed plastic grain extending continuously throughout said side wall and longitudinally thereof, said plastic grain forming an integral part of said side wall.

2. In a container according to claim 1 wherein said grain extends helically and uninterrupted entirely within said side wall obliquely to the longitudinal axis of the side wall.

References Cited by the Examiner

UNITED STATES PATENTS

| | | | |
|---|---|---|---|
| 972,095 | 10/10 | Booth | 222—92 |
| 1,026,598 | 5/12 | Neff | 138—118 |
| 2,152,516 | 3/39 | White | 222—107 X |
| 2,268,993 | 1/42 | Sanders | 222—92 |
| 2,307,817 | 1/43 | Austin | 260—785 |
| 2,438,901 | 4/48 | Coxe | 150—0.5 X |
| 2,443,053 | 6/48 | Parmelee. | |
| 2,613,993 | 10/52 | Holden | 138—118 |
| 2,620,514 | 12/52 | Sampson et al. | |
| 2,717,424 | 9/55 | Francis et al. | 15—0.5 X |
| 2,723,779 | 11/55 | Parker et al. | 222—107 X |
| 2,798,644 | 7/57 | Root | 222—215 |
| 2,808,967 | 10/57 | Miller | 222—215 |
| 2,810,424 | 10/57 | Swartswelter et al. | |
| 2,825,603 | 3/58 | Altergott | 222—215 X |
| 2,899,110 | 8/59 | Parker | 222—215 |
| 2,979,768 | 4/61 | Nichols. | |
| 3,008,187 | 11/61 | Slade. | |

FOREIGN PATENTS 545,261 5/42 Great Britain.

RAPHAEL M. LUPO, *Primary Examiner.*